United States Patent [19]

Fritz

[11] Patent Number: 4,902,184
[45] Date of Patent: Feb. 20, 1990

[54] APPARATUS FOR GROUPING OF PACKAGES

[76] Inventor: Günther Fritz, Glasbronnestrasse 12, D-7131 Neubärental, Fed. Rep. of Germany

[21] Appl. No.: 214,538

[22] Filed: Jul. 1, 1988

[30] Foreign Application Priority Data

Jul. 1, 1987 [DE] Fed. Rep. of Germany ... 8709053[U]

[51] Int. Cl.⁴ .................. B65B 35/44; B65B 35/50; B65B 35/54
[52] U.S. Cl. ................. 414/790.3; 414/793.7; 53/535; 53/540; 53/500; 198/626
[58] Field of Search .......... 53/248, 447, 535, 540, 53/541, 500; 198/626, 628; 414/46, 78, 79

[56] References Cited

U.S. PATENT DOCUMENTS

| 3,718,267 | 2/1973 | Hiebert et al. | 414/79 |
| 4,049,130 | 9/1977 | Bell | 214/8.5 A |
| 4,194,343 | 3/1980 | Myers et al. | 53/535 |
| 4,492,070 | 1/1985 | Morse et al. | 53/447 |

FOREIGN PATENT DOCUMENTS

| 1039456 | 3/1959 | Fed. Rep. of Germany . | |
| 1127810 | 4/1962 | Fed. Rep. of Germany | 53/541 |
| 1882471 | 8/1963 | Fed. Rep. of Germany . | |
| 2307053 | 8/1974 | Fed. Rep. of Germany . | |
| 2532410 | 2/1977 | Fed. Rep. of Germany . | |
| 0047808 | 8/1978 | Fed. Rep. of Germany | 414/46 |
| 8316881 | 2/1984 | Fed. Rep. of Germany . | |
| 3443071 | 6/1985 | Fed. Rep. of Germany . | |
| 1278938 | 12/1961 | France | 53/541 |
| 0051418 | 3/1986 | Japan | 414/79 |

Primary Examiner—Horace M. Culver
Attorney, Agent, or Firm—Spensley Horn Jubas & Lubitz

[57] ABSTRACT

An apparatus for grouping packages, composed of a horizontal delivery device for conveying individual packages in sequence, and a vertical conveyor device disposed for receiving the individual packages from the horizontal delivery device, conveying the individual packages vertically and arranging the individual packages in groups for transfer to a horizontal output device. The vertical conveyor device is composed of two parallel-extending endless belts and a plurality of parallel rows of brushes carried by each belt and disposed for engaging each individual package received by the vertical conveyor device from below and supporting each individual package as it is being conveyed vertically.

2 Claims, 3 Drawing Sheets

APPARATUS FOR GROUPING OF PACKAGES

BACKGROUND OF THE INVENTION

The invention relates to an apparatus for grouping of block-shaped packages, in particular apparatus having horizontal transfer belts followed by a vertical conveyor device from which the groups of packages are transferred to a horizontal output belt.

Packages intended for sale, such as blockshaped cardboard packages filled with a product, must often be combined into groups by the product manufacturer, so that they can be shipped and later stored; the packages in each group are then held together by suitable additional packaging means, for instance by sleeve-like cardboard bands or coverings of shrink-wrap film. The problem, in terms of the packaging technology, is accordingly to combine the packages, which as a rule arrive singly, into groups of packages; that is, a given number of packages must be stacked on or adjacent one another.

In known apparatuses, this is accomplished by delivering the individual packages successively to a vertical conveyor apparatus, which stacks the individual packages on one another. When the desired number of packages in a package group is attained, the group of packages is then taken by this vertical conveyor apparatus to output belts or similar devices for further processing, for instance for being banded together.

Vertical conveyor apparatuses of this type comprise a drum, for example, with receiving devices on its circumference, which receive the packages at the top of the drum and group them at a lower level. These conveyor apparatuses are structurally complicated, and the number of packages that can be grouped together per unit of time is limited.

SUMMARY OF THE INVENTION

It is therefore an object of the invention to provide a structurally simple conveyor apparatus, with which the conveying speed and thus the number of packages that can be grouped per unit of time can be increased.

The above and other objects are achieved, according to the invention, by an apparatus for grouping packages, comprising: horizontal delivery means for conveying individual packages in sequence; and vertical conveyor means disposed for receiving the individual packages from the horizontal delivery means, conveying the individual packages vertically and arranging the individual packages in groups for transfer to a horizontal output device, wherein the vertical conveyor means comprise two parallel-extending endless belts and a plurality of parallel rows of brushes carried by each belt and disposed for engaging each individual package received by the vertical conveyor means from below and supporting each individual package as it is being conveyed vertically.

Further features of the invention will be described below.

One exemplary embodiment of the apparatus according to the invention will now be described in further detail with reference to the drawings.

DESCRIPTION OF THE PREFERRED EMBODIMENTS

Figure 1:
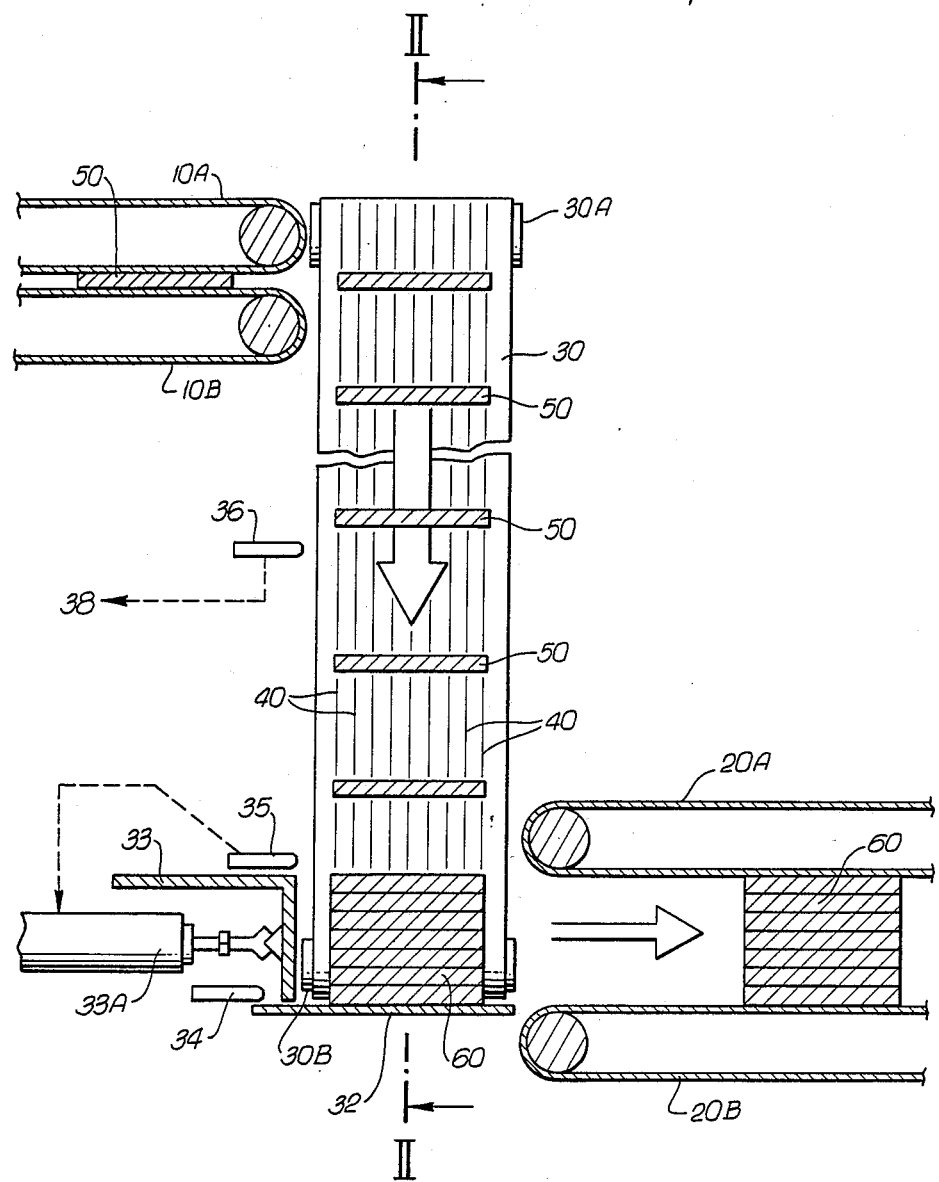
FIG. 1 is a longitudinal section through the conveyor apparatus, taken in the plane I—I of FIG. 2.
Figure 2:
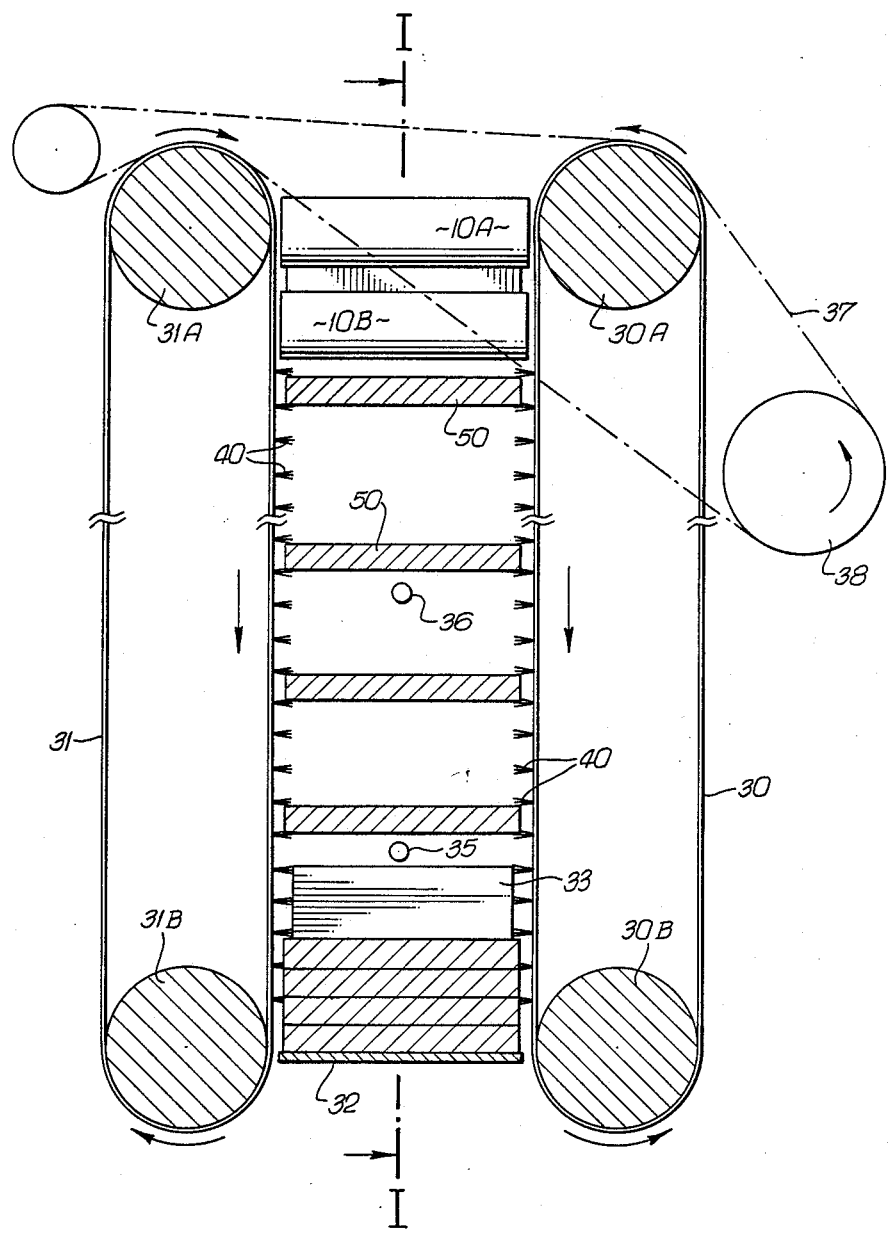
FIG. 2 is a cross section through the conveyor apparatus taken in the plane II—II of FIG. 1.
Figure 3:
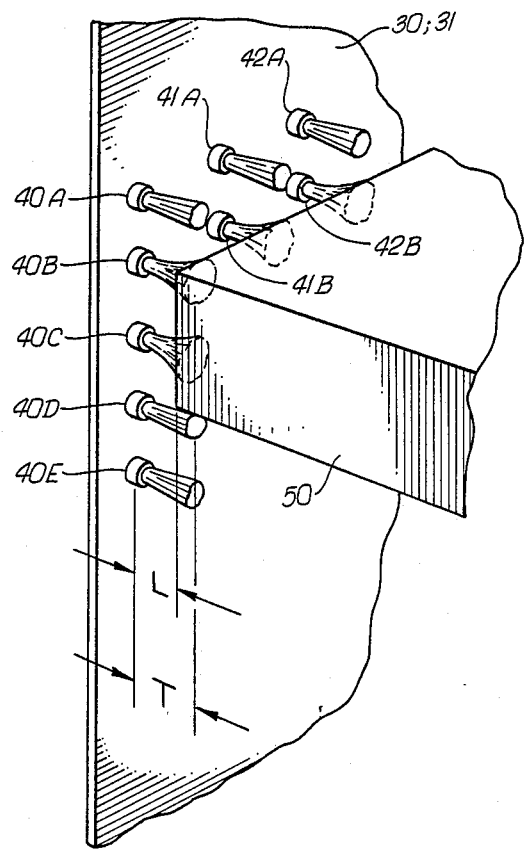
FIG. 3 is a detail view of part of a brush belt, with a package held by the brushes.

The vertical conveyor apparatus shown in FIGS. 1-3 comprises two continuous brush belts 30, 31 traveling parallel to one another, the belts delimiting a conveyor chute in which the packages 50 are held by rows of brushes 40 carried by belts 30 and 31 and are transported downwardly. The conveyor chute is formed by the belt reaches which face one another and brushes 40 are mounted such that, in the region of the conveyor chute, the brushes 40 on each belt face the other belt. Brush belts 30, 31 are guided at their upper and lower ends over corresponding rollers 30A, 30B and 31A, 31B, respectively, and belts 30 and 31 are driven in synchronism via a drive chain 37 by a motor 38. Drive chain 37 engages one roller of each belt and is guided by suitable rollers, e.g. deflection rollers, not shown in detail, such that rollers 30A, 30B, 31A and 31B all rotate at the same speed and belts 30 and 31 advance at the same speed.

As shown in FIG. 3, brush belts 30, 31 have, on the outer surfaces, brushes 40A, ... 40E and 41A, ..., 42A ... and so forth, disposed equidistantly from one another in rows and columns. The spacing between the two brush belts 30 and 31 is adjustable, and this spacing is adjusted so that the lateral spacing L between each package 50 to be conveyed and each belt 30,31 is sufficiently shorter than the length T of the brushes to assure that the intrinsic elasticity or retaining force of one horizontal row of brushes (in FIG. 3, the brush row 40D, 41D, 42D, ... ), together with the intrinsic elasticity or retaining force of the opposed brush row on the other belt, will enable those two rows of brushes to support the weight of a package 50. On the other hand, the brushes are made elastic enough that the "trapped" brushes, i.e. those which contact the sides of a package 50, (in FIG. 3, these are the brushes in rows B and C) can deflect laterally.

Thus the brush row D in FIG. 3, in its entirety, virtually forms a supporting bottom for the package 50, while, in contrast, the laterally deflected brushes in rows B and C exert a certain centering effect, keeping the spacing L of the package 50 from the two lateral brush belts approximately the same.

Reverting to FIG. 1, an upper transfer belt 10A and a lower transfer belt 10B are disposed at the upper end of brush belts 30, 31, and between transfer belts 10A and 10B, the packages 50 can be delivered to the brush conveyors horizontally at high speed; the chute formed by brush belts 30 and 31 can be provided, in the region facing transfer belts 10A, 10B, with suitable stop devices (not shown) in order to put the packages 50 into a defined horizontal position.

Located at the lower end of the chute formed by brush belts 30, 31 is a bottom plate 32, which is at the same level as the upper reach of a lower output belt 20B, which in turn serves to carry away the package groups 60, formed of a predetermined number of packages 50. An upper output belt 20A, which is adjustable in height, bears upon the carried-away package groups 60 and keeps the packages 50 together in each group 60 until the aforementioned additional packaging apparatuses, for example for banding each group 60, can assure that each package group will stay together as a unit.

At the side of the brush belts 30, 31 located opposite the two output belts 20A, 20B, a pusher 33 is provided, which is insertable horizontally by a drive unit 33A, for example a hydraulic or pneumatic cylinder, into the lower region of the chute formed by brush belts 30 and 31, to such a depth that the package groups 60 that have been formed are engaged by the two following output belts 20A and 20B and carried onward.

Light barriers are provided for controlling the various processes. One light barrier 34, disposed directly above bottom plate 32, checks whether a package 50 is resting on bottom plate 32. A further light barrier 35, which is adjustable in height, checks whether the desired stack height, and hence the desired number of packages 50 forming one package group 60, has been attained, and controls drive unit 33A of pusher 33.

Finally, at approximately the midpoint of the height of the two brush belts 30 and 31, a further light barrier 36 is provided, which stops the motor 38 (and if necessary the drive for transfer belts 10A, 10B) in the event of a malfunction, and in particular if there is a backup of packages in the conveyor chute.

The described apparatus functions as follows:

The packages 50 conveyed in succession by transfer belts 10A, 10B are "shot" into the entry region of the chute formed by brush belts 30, 31, where, as described above, each successive package comes to rest on one of the horizontal brush rows of each belt 30,31 and is conveyed downwardly in the chute. Packages 50 are then deposited successively on top of one another on bottom plate 32, until the desired stack height and hence the desired number of packages 50 forming one package group 60 has been attained. Light barrier 35, which is adjusted to this height, reports this condition to drive unit 33A of pusher 33, whereupon pusher 33 is extended into the chute and pushes the completed package group 60 onto output belt 20B.

Depending on the conveyor speed, it may be necessary to interrupt the conveying operation until such time as pusher 33 has been returned to its original position. However, it is also possible to utilize the horizontally extending upper portion of pusher 33 as an "intermediate bottom plate" for temporary storage of the packages 50 conveyed from above, which packages will subsequently be set down together, pre-grouped as it were, onto bottom plate 32 once pusher 33 has been retracted again.

It will be appreciated that in order for light barriers 35 and 36 to perform their intended functions, each must be associated with suitable time monitoring circuitry to distinguish between short duration light beam interruptions resulting from passage of each individual package during normal operations and longer duration interruptions indicating the condition to be sensed.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for grouping packages, comprising: horizontal delivery means composed of upper and lower transfer belts for sequential high speed delivery of the packages; vertical conveyor means disposed for receiving the individual packages from said horizontal delivery means, conveying the individual packages vertically and arranging the individual packages in groups for transfer to a horizontal output device, wherein said vertical conveyor means comprise two parallel-extending endless belts and a plurality of parallel rows of brushes carried by each said belt and disposed for engaging each individual package received by said vertical conveyor means from below and supporting each individual package as it is being conveyed vertically; a horizontal bottom plate disposed at the lower end of said vertical conveyor means for receiving the individual packages conveyed by said conveyor means until successive packages are stacked to form one package group; a pusher displaceable parallel to the plane of said bottom plate and between said endless belts for transferring each package group to the horizontal output device, said pusher having a horizontally extending upper portion located above, and spaced vertically from said bottom plate for temporary storage and pre-grouping of packages conveyed by said vertical conveyor means; and a light barrier connected to control the operation of said pusher and disposed at a height above said bottom plate that corresponds to the desired height of one package group.

2. An apparatus as defined in claim 1 in combination with the horizontal output device, wherein said horizontal output device has an output belt providing a support surface for the package groups and said bottom plate is disposed at the same height as said output belt and terminates directly before said output belt.

* * * * *